United States Patent [19]

Dannevang

[11] Patent Number: 5,587,134
[45] Date of Patent: Dec. 24, 1996

[54] PROCESS FOR DECOMPOSING AMMONIA IN AN OFF-GAS

[75] Inventor: Flemming Dannevang, Copenhagen, Denmark

[73] Assignee: Haldor Topsøe A/S, Denmark

[21] Appl. No.: 542,145

[22] Filed: Oct. 12, 1995

[30] Foreign Application Priority Data

Oct. 14, 1994 [DK] Denmark ................................. 1184/94

[51] Int. Cl.$^6$ ...................................................... B01D 53/22
[52] U.S. Cl. ........................................ 423/237; 423/239.1
[58] Field of Search ................................... 423/235, 237, 423/239.1

[56] References Cited

U.S. PATENT DOCUMENTS

| | | | |
|---|---|---|---|
| 3,947,554 | 3/1976 | Senes et al. | 423/403 |
| 3,993,731 | 11/1976 | Morikawa et al. | 423/239 |
| 4,138,469 | 2/1979 | Kato et al. | 423/239 |
| 4,179,412 | 12/1979 | Inaba et al. | 252/472 |
| 4,188,364 | 2/1980 | Gladden | 423/213.2 |
| 5,227,145 | 7/1993 | Kintaichi et al. | 423/239 |

FOREIGN PATENT DOCUMENTS 0172972 12/1984 European Pat. Off. .

OTHER PUBLICATIONS

Database WPI, Section ch, Week 7706, Derwent Publications Ltd., London, GB; AN 77–10036Y & JP–A–51 149 165 (Kyushi Sekisui Kogy), 22 Dec. 1976.

*Primary Examiner*—Michael Lewis
*Assistant Examiner*—Amy M. Harding
*Attorney, Agent, or Firm*—Ostrolenk, Faber, Gerb & Soffen, LLP

[57] ABSTRACT

In a process for the catalytic low temperature oxidation of ammonia to nitrogen in an ammonia containing off-gas at a temperature of between 200° C. and 500° C. the improvement comprises, sulphating a catalyst comprising on an inert carrier a metal selected from the group of copper, cobalt, iron, chromium, nickel, manganese and mixtures thereof in the form of their oxides and/or sulphates and a further component selected from the group of platinum metals;

contacting the ammonia containing atmosphere with the catalyst, and withdrawing a decomposed gas being rich in nitrogen.

9 Claims, No Drawings

PROCESS FOR DECOMPOSING AMMONIA IN AN OFF-GAS

BACKGROUND OF THE INVENTION

1. Field of the Invention

The present invention is directed to a process for decomposing ammonia and more specifically a process for the selective decomposition of ammonia to nitrogen in an ammonia containing off-gas at low temperatures in the presence of a catalyst.

2. Description of the Related Art

Catalytic decomposition of ammonia with oxygen to nitrogen and water proceeds at the following reaction:

$$4NH_3 + 3O_2 \rightarrow 2N_2 + 6H_2O$$

In addition to the above oxidation reaction, ammonia further reacts with oxygen to nitrogen oxides mainly by the reaction:

$$4NH_3 + 7O_2 \rightarrow 4NO_2 + 6H_2O$$

$$4NH_3 + 5O_2 \rightarrow 4NO + 6H_2O$$

$$2NH_3 + 2O_2 \rightarrow N_2O + 3H_2O$$

For reasons of high formation of desired nitrogen, the process depends substantially on the selectivity of a decomposition catalyst for the formation of nitrogen as the main oxidation product rather than the undesired nitrogen oxides.

Known catalysts being active in the selective decomposition of ammonia are cobalt or cobalt oxide containing catalysts as described in German Offenlegungsschrift No. 2,026,657, and vanadium oxide containing catalysts supported on a carrier of alumina as disclosed in U.S. Pat. No. 5,139,756. Other known catalysts for the decomposition of ammonia in the lower temperature range contain platinum metals (German Offenlegungsschrift No. 2,447,552).

We have now found that selectivity and activity of the known ammonia decomposition catalysts are, surprisingly, improved when sulfating the catalysts during or prior to contact with ammonia containing gas.

SUMMARY OF THE INVENTION

In accordance with the above findings and observations, this invention provides a process for the catalytic low temperature oxidation of ammonia in an ammonia containing gas at a temperature of between 250° C. and 500° C. the improvement comprises, sulfating a catalyst comprising of an inert carrier a metal selected from the group of copper, cobalt, iron, chromium, nickel, manganese and mixtures thereof in the form of their oxides and/or sulfides and a further component selected from the group of platinum metals, contacting the ammonia containing gas with the sulfated catalyst; and withdrawing a decomposed gas being rich in nitrogen.

DETAILED DESCRIPTION OF THE PREFERRED EMBODIMENTS

In carrying out the process industrially, the catalysts will typically comprise the active catalytic metal in an amount of 1–20% by weight and a platinum metal promoter in an amount of 100–2000 ppm by weight, supported on the carrier. Suitable carriers may be selected from alumina, titania, silica, or mixtures thereof.

The catalysts are preferably used in the shape of rings, pellets, tablets and monolithic structured bodies.

Convenient procedures for manufacturing the catalysts for use in this invention comprise steps of impregnating the carrier material with an aqueous solution of a salt of the active compounds and then heating to a temperature sufficient to decompose the salt to oxide or sulfate of the metal component.

As mentioned before, the activity and the selectivity of the catalysts during decomposition of ammonia is considerably increased, when the catalysts are used in their sulfated form. To maintain the catalysts in the sulfated form, volatile sulphur compounds in an amount of typically 1–4000 ppm are, preferably, added to the ammonia containing gas prior to contact with the catalysts.

By the process, an off-gas, having ammonia in a concentration of up to 10,000 ppm by volume, is contacted with the above catalysts usually arranged in a reactor as a fixed bed. At an inlet temperature of between 200° C. and 500° C., preferably 230°–380° C., ammonia decomposition to nitrogen is nearly complete.

EXAMPLE 1

Preparation of a Co/Pt Catalyst Supported on a Silica Carrier

A silica carrier in the form of a ring with an outer diameter of 10 mm was calcined at 600° C. in air.

The calcined carrier was then impregnated with an aqueous solution of $Co(NO_3)_2$ to a final cobalt concentration of 10% by weight calculated on the total weight of the impregnated carrier. The carrier was dried after impregnation. In a subsequent step, the carrier was further impregnated with platinum from an aqueous solution of $H_2PtCl_6$ to a final load of Pt of 670 ppm by weight calculated on the total weight of the impregnated carrier. Finally, the impregnated carrier was dried and calcined at 500° C. in air to obtain the active catalyst.

EXAMPLE 2

In a procedure similar to the one of Example 1, a catalyst was prepared having 10% by weight Cu and 670 ppm by weight Pt as the active material on a silica carrier.

The calcined carrier was impregnated with an aqueous solution of $Cu(NO_3)_2$, and, subsequently, with an aqueous solution of $H_2PtCl_6$. The impregnated carrier is then calcined as described in Example 1.

EXAMPLE 3

Preparation of Catalyst Having Cu, Ni and Pt as Active Material on a Silica Carrier The catalyst was prepared at a procedure similar to the one of Example 2 except for an additional step of impregnating the carrier with an aqueous solution of $Ni(NO_3)_2$ to a final load of Ni of 10% by weight before impregnation with platinum.

EXAMPLE 4

Preparation of a Catalyst Having Cu, Pd and Pt as Active Material on a Silica Carrier A calcined silica carrier as described above was impregnated with an aqueous solution of $Cu(NO_3)_2$ to a final load of Cu of 10% by weight.

The Cu-impregnated carrier was dried and then impregnated with Pd and Pt from an aqueous solution of $Pd(NO_3)_2$ and $H_2PtCl_6$, each to a content of 670 ppm by weight calculated on the total weight of the impregnated carrier. Finally, the impregnated catalyst was activated by calcination at 500° C. in air.

EXAMPLE 5

The catalysts, as prepared in Example 1–4, were tested for their activity and selectivity in the decomposition of ammonia to nitrogen.

Samples of 0.25 liter were loaded as fixed bed in an adiabatic operated reactor tube. A gas with the composition of 20 vol% $O_2$
2 vol% $H_2O$
1000 ppm $NH_3$, and a sulfur dioxide content as specified in the Table below was passed under the conditions specified in the Table through the reactor. Ammonia conversion rates and selectivity for nitrogen obtained with the catalysts under the specified conditions are summarized in the Table.

| Catalyst concentration | Temp °C. Inlet | Gas Flow NHSV $Nm^3/m^3/h$ | $SO_2$-concentration Inlet ppm | $NH_3$-concentration Inlet ppm | Conv.-outlet % | $N_2$ selectivity % |
|---|---|---|---|---|---|---|
| Co/Pt | 232 | 10000 | 0 | 1000 | 94 | 53 |
|  | 292 | 10000 | 200 | 1000 | 92 | 77.9 |
| Cu/Pt | 290 | 10000 | 0 | 1000 | 92 | 26.1 |
|  | 293 | 10000 | 10 | 1000 | 98 | 95.7 |
|  | 293 | 10000 | 200 | 1000 | 92 | 97 |
|  | 330 | 10000 | 200 | 1000 | 99,8 | 90.9 |
| Cu/Ni/Pt | 290 | 10000 | 0 | 1000 | 95 | 45.3 |
|  | 306 | 10000 | 200 | 1000 | 96 | 98.8 |
| Cu/Pd/Pt | 290 | 10000 | 0 | 1000 | 95 | 38.9 |
|  | 328 | 10000 | 200 | 1000 | 99,6 | 99.1 |

As is obvious from the results, decomposition of ammonia to nitrogen is considerably improved in the presence of small amounts of sulfur dioxide added to the test gas at the reactor inlet. When compared to the known processes operating with non-sulfated catalysts, the presence of sulfur in the gas results in a high selectivity during decomposition of ammonia to nitrogen. Formation of noxious nitrogen oxides, as with the known catalytic ammonia decomposition processes, is substantially depressed.

I claim:

1. In a process for the catalytic low temperature oxidation of ammonia with oxygen to nitrogen in an ammonia containing off-gas that also contains oxygen at a temperature of between 200° C. and 500° C., said oxygen consisting essentially of $O_2$, the improvement comprising the steps of:

sulfating a catalyst comprising on an inert carrier a metal selected from the group consisting of copper, cobalt, iron, chromium, nickel, manganese and mixtures thereof in the form of their oxides and/or sulfates and a further component selected from the group of platinum metals;

contacting the ammonia containing off-gas with the catalyst, and withdrawing a decomposed gas being rich in nitrogen.

2. The process of claim 1, wherein the platinum metals comprise platinum and/or palladium.

3. The process of claim 1, wherein the catalyst comprises the metal in an amount of 1–20% by weight calculated as the total weight of the catalyst.

4. The process of claim 1, wherein the catalyst comprises the further component in an amount of 100–2000 ppm by weight calculated on the total weight of the catalyst.

5. The process of claim 1, wherein the carrier is selected from the group consisting of alumina, titania, silica and mixtures thereof.

6. The process of claim 1, wherein the catalyst is in a shape of rings, pellets, tablets or monolithic structured bodies.

7. The process of claim 1, wherein the step of sulfating the catalyst comprises adding a volatile sulfur compound to the off-gas.

8. The process of claim 7, wherein the volatile sulphur compound is added in an amount of between 1–4000 ppm by volume to the off-gas.

9. The process of claim 1, whereby the oxidation of ammonia to nitrogen is substantially complete.

* * * * *